US012472526B2

(12) United States Patent
Perry

(10) Patent No.: US 12,472,526 B2
(45) Date of Patent: Nov. 18, 2025

(54) INTEGRATED FOUNTAIN AND VASE ASSEMBLY

(71) Applicant: Thomas Perry, Reliance, SD (US)

(72) Inventor: Thomas Perry, Reliance, SD (US)

( * ) Notice: Subject to any disclaimer, the term of this patent is extended or adjusted under 35 U.S.C. 154(b) by 343 days.

(21) Appl. No.: 18/131,440

(22) Filed: Apr. 6, 2023

(65) Prior Publication Data

US 2024/0335853 A1 Oct. 10, 2024

(51) Int. Cl.
*B05B 17/08* (2006.01)
*A47G 7/06* (2006.01)

(52) U.S. Cl.
CPC ................ *B05B 17/08* (2013.01); *A47G 7/06* (2013.01)

(58) Field of Classification Search
CPC .................................. B05B 17/08; A47G 7/06
USPC ............................................... 239/17, 22, 23
See application file for complete search history.

(56) References Cited

U.S. PATENT DOCUMENTS

| | | | | |
|---|---|---|---|---|
| 5,598,662 A | 2/1997 | Droste | | |
| 6,527,197 B1 * | 3/2003 | Lin | B05B 17/08 239/23 | |
| 11,180,285 B2 | 11/2021 | Ansaldo-Swain | | |
| 2002/0117554 A1 * | 8/2002 | Lin | B05B 3/0427 239/222.11 | |

FOREIGN PATENT DOCUMENTS

| | | |
|---|---|---|
| CN | 201267122 | 9/2008 |
| CN | 202174036 | 3/2012 |
| CN | 202823729 | 3/2013 |
| CN | 113039965 | 6/2021 |
| FR | 2766685 | 1/1997 |
| JP | 1999266723 | 10/1999 |

* cited by examiner

*Primary Examiner* — Christopher S Kim

(57) ABSTRACT

An integrated fountain and vase assembly for increasing longevity of blooms of cut flowers includes a vessel, which has a top that is open and a bottom that is both closed and substantially planar. A plate attached to an inner perimeter of the vessel defines a reservoir for water. A monument is attached to and extends upwardly from the plate. An opening in the plate allows for insertion of stems of plants into the water. A water pump in the reservoir pumps the water through a tube that opens proximate to an upper end of the monument. The water exits the tube and enters a fluidic path, which extends between the tube and the opening and which has at least a segment that extends along an exterior surface of the monument. The water thus is aerated and rendered resistant to formation of algae.

15 Claims, 5 Drawing Sheets

INTEGRATED FOUNTAIN AND VASE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to flower arrangement devices and more particularly pertains to a new flower arrangement device for increasing longevity of blooms of cut flowers. The present invention discloses a flower arrangement device which is both reusable as a vase for cut flowers and which provides visual and audible enjoyment even without cut flowers by means of flowing water.

(2) Description of Related Art Including Information Disclosed Under 37 CFR 1.97 and 1.98

The prior art relates to flower arrangement devices, which may comprise garden fountains in underground fluidic communication with a plurality of terraced planting beds or with a plurality of planters, fountain walls to which planters are attachable, pedestal fountains having planters attached to and extending from their upper ends, and rotatable arrays of planters having an axially positioned spray nozzle. What is lacking in the prior art is a flower arrangement device comprising a fountain with an integrated vase that is sized for positioning upon a desktop, countertop, or the like, wherein stems of cut flowers are insertable through an opening to a reservoir of the fountain.

BRIEF SUMMARY OF THE INVENTION

An embodiment of the disclosure meets the needs presented above by generally comprising a vessel, which has a top that is open and a bottom that is both closed and substantially planar. The vessel is configured to be positioned atop a substantially horizontal surface. A plate, which is attached to an inner perimeter of the vessel, defines a reservoir between the bottom of the vessel and the plate. The reservoir is configured to contain water. A monument is attached to and extends upwardly from the plate. An opening, which is positioned in the plate between the monument and the inner perimeter of the vessel, is configured for insertion of stems of plants such that cut ends of the stems are positioned in the water in the reservoir. A water pump is positioned in the reservoir and is operationally engaged to a tube, which extends from the water pump, through the monument, and opens proximate to an upper end of the monument. A fluidic path extends between the tube and the opening, with at least a segment of the fluidic path extending along an exterior surface of the monument. The water pump is configured to pump water through the tube. The water exits the tube, proximate to the upper end of the monument, and flows along the fluidic path and through the opening, whereby the water is aerated and rendered resistant to formation of algae.

Another embodiment of the disclosure includes an integrated fountain and vase system, which comprises an integrated fountain and vase assembly, as describe in the disclosure above. Water is positioned in the reservoir and a stem of at least one plant is positioned through the opening into the water.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
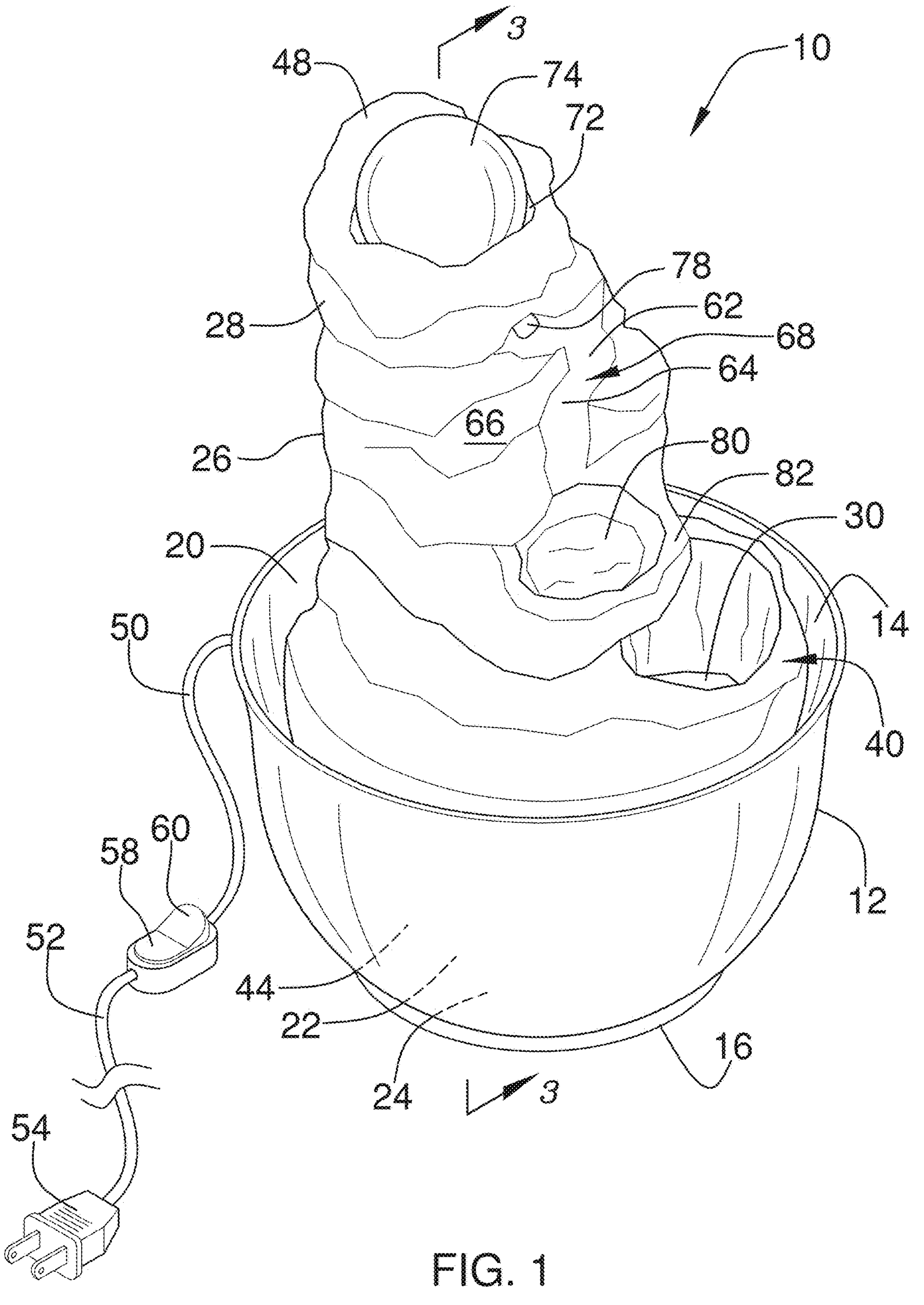
FIG. 1 is an isometric perspective view of an integrated fountain and vase assembly according to an embodiment of the disclosure.
Figure 2:
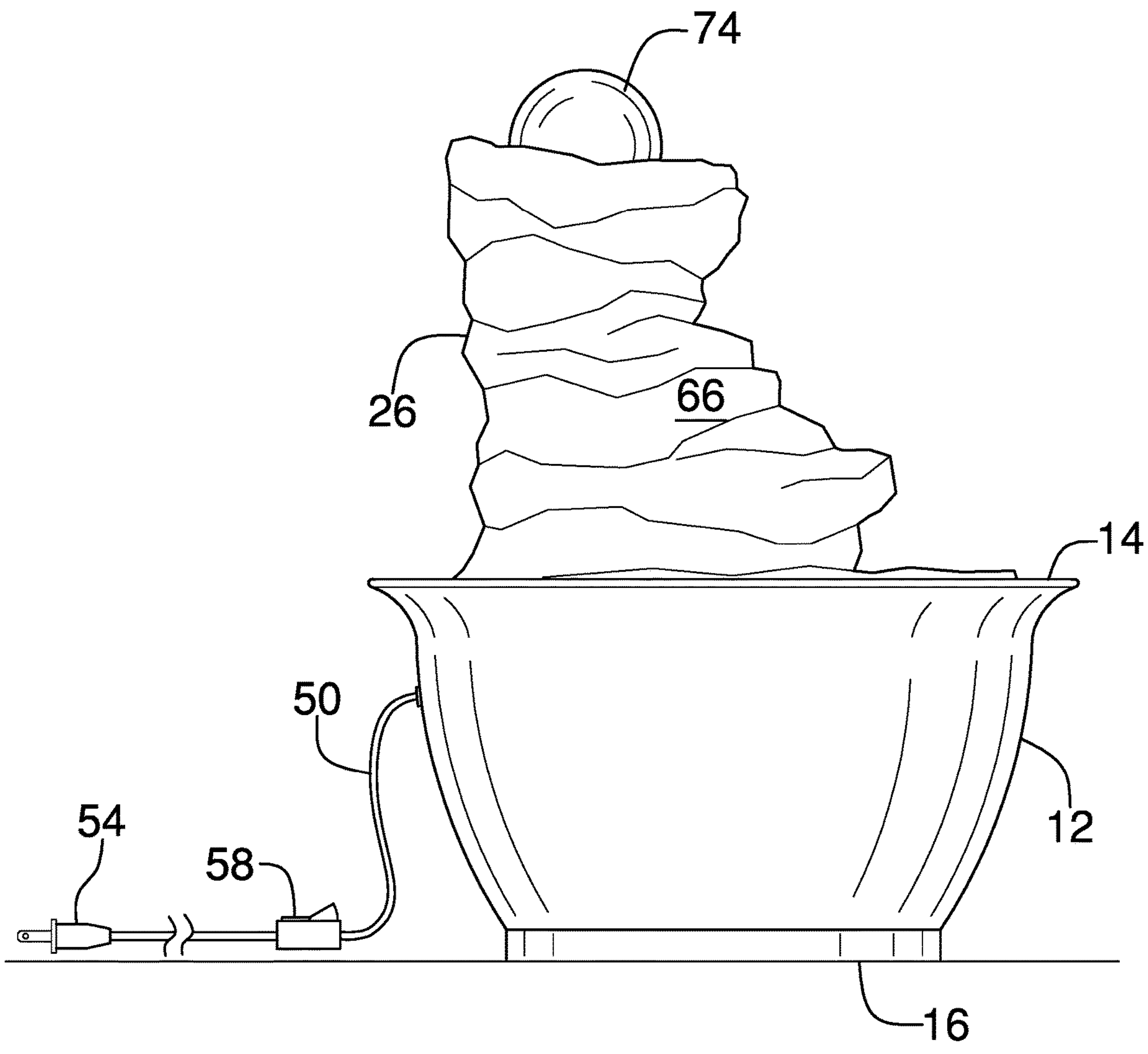
FIG. 2 is a side view of an embodiment of the disclosure.

With reference now to the drawings, and in particular to FIGS. 1 through 5 thereof, a new flower arrangement device embodying the principles and concepts of an embodiment of the disclosure and generally designated by the reference numeral 10 will be described.

As best illustrated in FIGS. 1 through 5, the integrated fountain and vase assembly 10 generally comprises a vessel 12, which has a top 14 that is open and a bottom 16 that is both closed and substantially planar. The vessel 12 is configured to be positioned atop a substantially horizontal surface, such as a desktop, countertop, or the like. The vessel 12 may be circular bowl shaped, as is shown in FIG. 1. As shape of the vessel 12 is not critical to function of the integrated fountain and vase assembly 10, the present invention anticipates the vessel 12 being alternatively shaped, such as, but not limited to, cuboid, prismatic, or the like.

Figure 3:
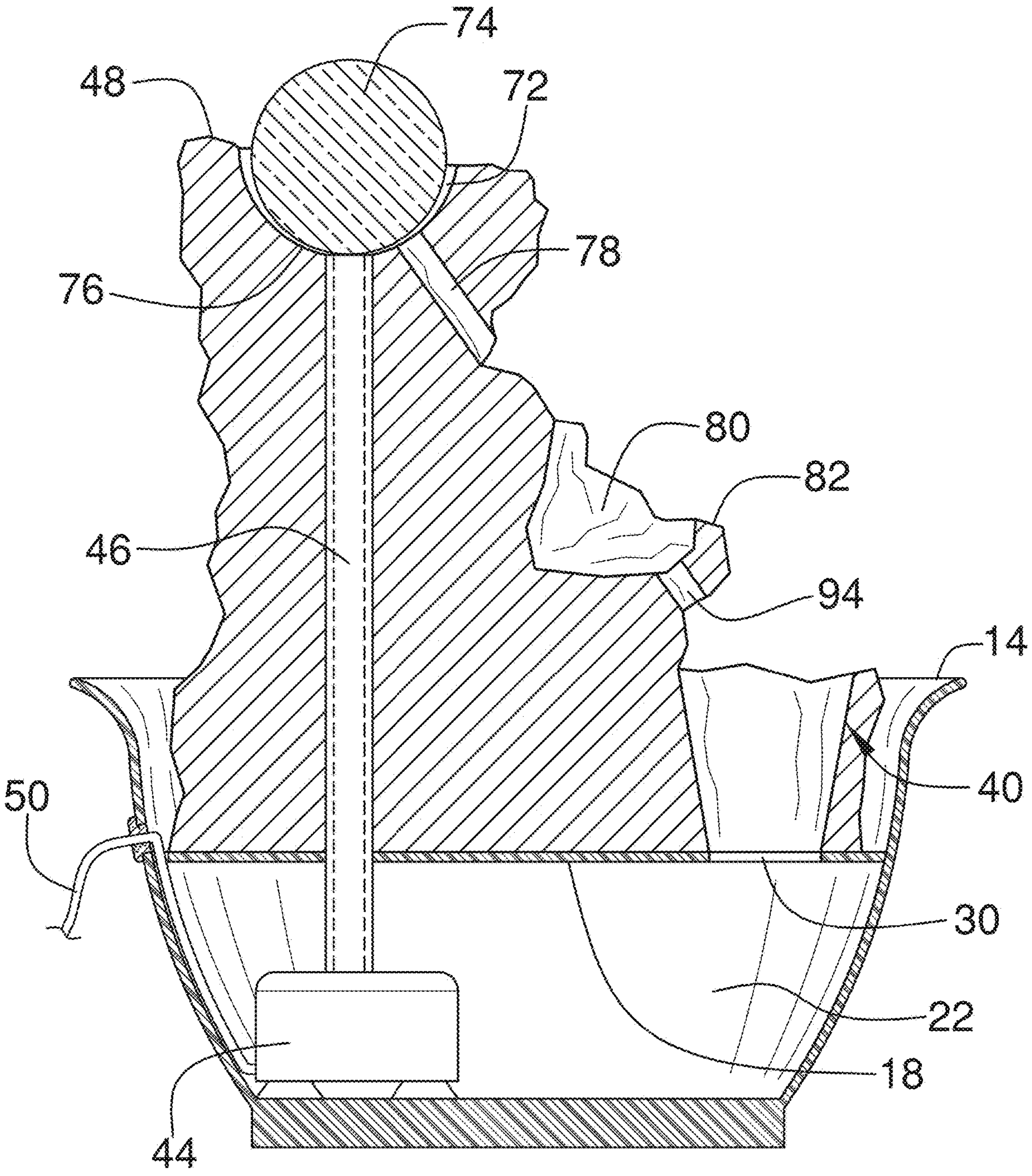
FIG. 3 is a cross-sectional view of an embodiment of the disclosure.

A plate 18, which is attached to an inner perimeter 20 of the vessel 12, defines a reservoir 22 between the bottom 16 of the vessel 12 and the plate 18. The reservoir 22 is configured to contain water 24. A monument 26 is attached to and extends upwardly from the plate 18. While the monument 26 is anticipated to be of a variety of shapes, one example is shown in FIGS. 1-5, wherein the monument 26 is shaped as a miniature of a mountain peak 28. Other examples, not shown, include, but are not limited to, buildings, such as temples, houses, or the like, geometric shapes, and miniature geological features in addition to mountain peaks 28, such as hills, cliffs, or the like. While FIG. 3 shows the monument 26 as being substantially solid, such as would be obtained when forming the monument 26 from a block or from foam-filling of a mold, the present invention also anticipates monument 26 being substantially hollow.

Figure 5:
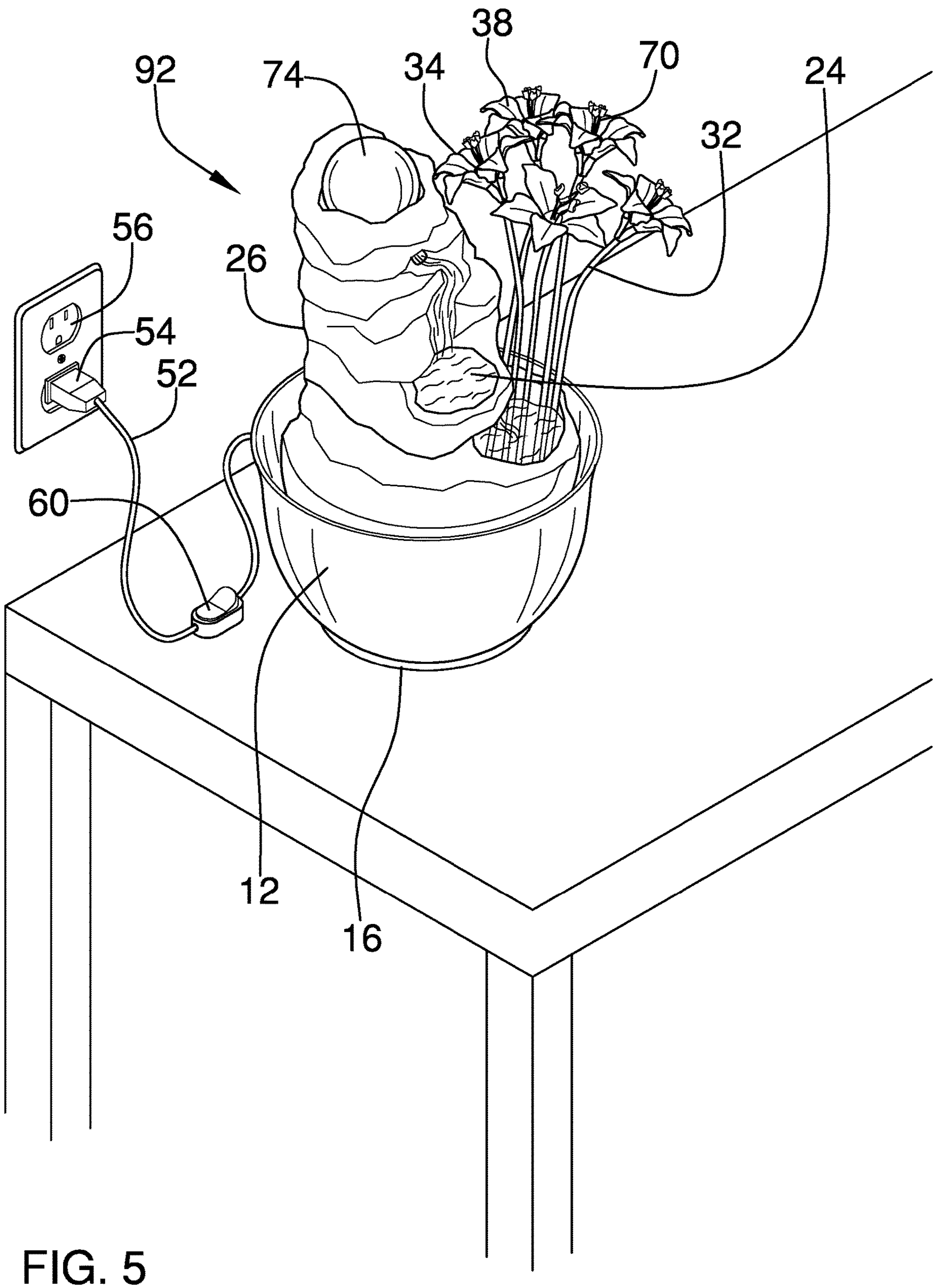
FIG. 5 is an in-use view of an embodiment of the disclosure.

An opening 30, which is positioned in the plate 18 between the monument 26 and the inner perimeter 20 of the vessel 12, is configured for insertion of stems 32 of plants 34 so that cut ends 36 of the stems 32 are positioned in the water 24 in the reservoir 22. While only a single opening 30 is depicted in FIGS. 1 and 5, the present invention also anticipates more than one opening 30, which could be useful, for example, in separating or otherwise arranging stems 32 of different varieties of flowers 38.

Figure 4:
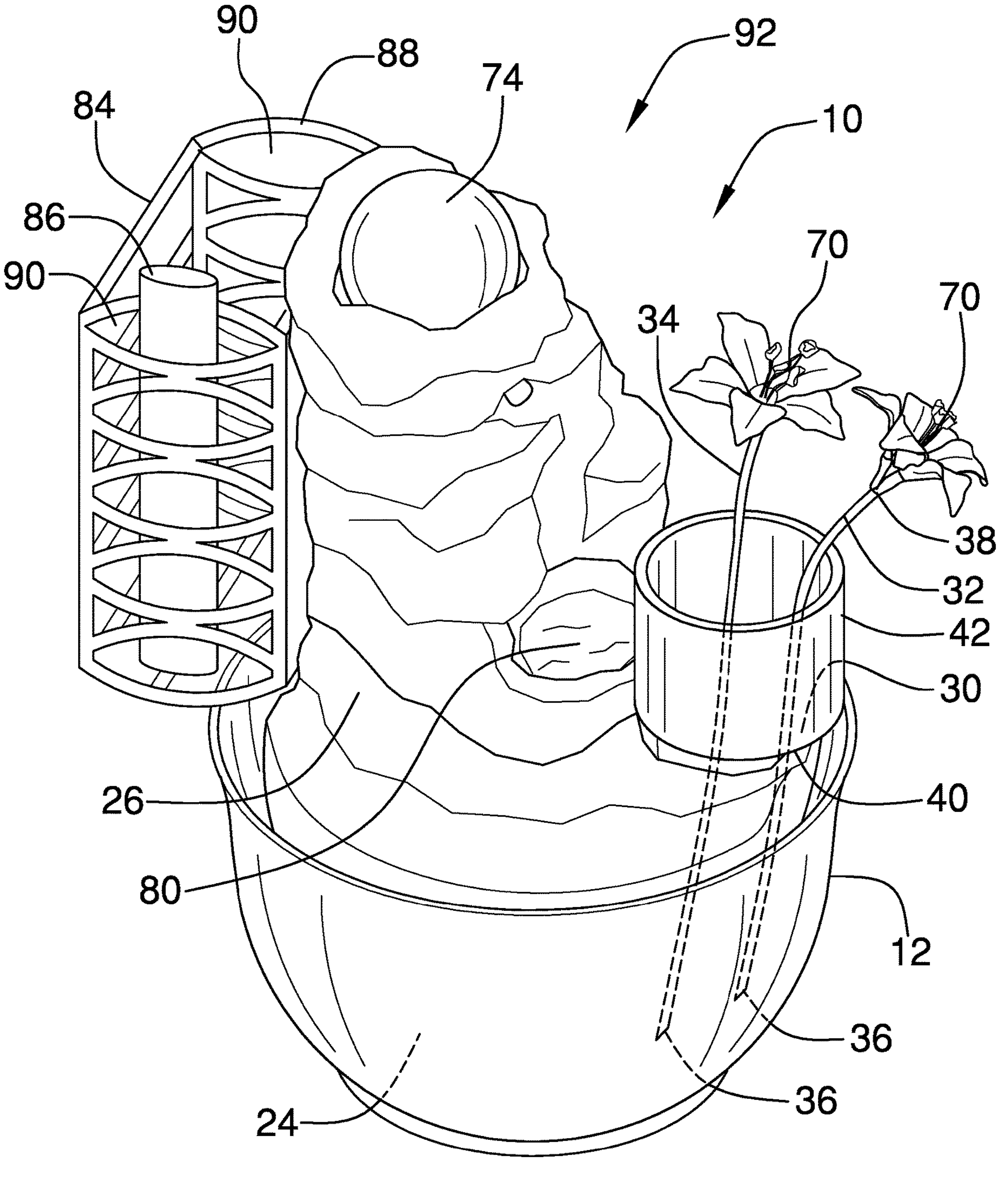
FIG. 4 is an isometric perspective view of an embodiment of the disclosure.

A first ring 40 is attached to the plate 18 or to the vessel 12 and is positioned substantially over the opening 30. The first ring 40 is configured to support the stems 32 of the plants 34 in a substantially upright configuration. The present invention also anticipates the first ring 40 being attached to the plate 18 or to the vessel 12 and being positioned within the reservoir 22. As is shown in FIG. 1, the first ring 40 is attached to the plate 18 and extends from the opening 30. As is shown in FIG. 3, the first ring 40 is inverted conical frustrum shaped and thus is configured to allow for splaying of the stems 32. The present invention also anticipates a second ring 42, which is selectively positionable atop the first ring 40, as is shown in FIG. 4. The second ring 42 is configured to provide additional support to the stems 32 of the plants 34. The second ring 42 also is anticipated to be fixedly attached to the first ring 40.

A water pump 44 is positioned in the reservoir 22 and is operationally engaged to a tube 46, which extends from the water pump 44, through the monument 26, and opens proximate to an upper end 48 of the monument 26. A power module 50 is operationally engaged to the water pump 44 and is positioned to selectively power the water pump 44. As is shown in FIG. 5, the power module 50 comprises a power cord 52, which is operationally engaged to and extends from the water pump 44. A plug 54 of the power cord 52 is configured to engage the water pump 44 selectively and operationally to a source of electrical current, such as an outlet 56. The present invention also anticipates the power module 50 comprising a battery (not shown), which may be rechargeable.

A switch 58, which is operationally engaged to the power module 50 and to the water pump 44, is configured to be switched to selectively power the water pump 44. The switch 58 may comprise a toggle switch 60, as is shown in FIG. 5, or other switching means, such as, but not limited to, slide switches, dials, or the like. Use of a dial would enable a user to control a flow rate of the water 24 through the water pump 44.

A fluidic path 62 extends between the tube 46 and the opening 30, with at least a segment 64 of the fluidic path 62 extending along an exterior surface 66 of the monument 26. As is shown in FIGS. 1 and 5, the segment 64 of the fluidic path 62 comprises a channel 68. The water pump 44 is configured to pump water 24 through the tube 46. The water 24 exits the tube 46 proximate to the upper end 48 of the monument 26 and flows along the fluidic path 62 and through the opening 30, whereby the water 24 is aerated and rendered resistant to formation of algae. Maintaining aerated water 24 free of algae increases longevity of blooms 70 of cut flowers 38.

In addition to cut flowers 38, the integrated fountain and vase assembly 10 would be useful with cuttings of other plants 34, such as, but not limited to, basal, rosemary, and the like, which provide pleasing fragrances. The integrated fountain and vase assembly 10 also is anticipated to be useful in promoting root growth in cuttings of plants 34 for propagation purposes. The present invention anticipates addition of one or more of plant food, acetylsalicylic acid, sugar, copper, or bleach to the water 24 as this may further improve longevity of the blooms 70.

Cut flowers 38 are often given as gifts, either alone or in vases. If given without a vase, a recipient of the cut flowers 38 is required to provide one. In either case, when the cut flowers 38 are no longer desired, the vase must be stored until its use again is required. The integrated fountain and vase assembly 10 not only prolongs the enjoyable life of the cut flowers 38, it also is suitable for permanent placement in a living or office space and provides both visual and audible relaxation to the recipient. Upon acquiring additional cut flowers 38, the integrated fountain and vase assembly 10 is immediately available for their positioning and presentation.

While the fluidic path 62 is anticipated to have a wide variety of configurations, one example is presented in FIGS. 1-5. A recess 72 extends into the upper end 48 of the monument 26 so that the tube 46 opens into the recess 72. The recess 72 is configured for pooling of water 24 prior to the water 24 entering the fluidic path 62. The recess 72 is substantially hemispherical. A ball 74, which is substantially circumferentially complementary to the recess 72, is selectively positionable in the recess 72. The ball 74 is configured to float and to rotate upon the water 24 that is pooled in the recess 72. The ball 74 may comprise glass, ceramic, plastic, or the like. As is shown in FIG. 3, the tube 46 extends axially from a lower limit 76 of the recess 72. The present invention also anticipates the tube 46 being offset from the position shown is FIG. 3, which would act to increase rotation of the ball 74.

Also, in this configuration of the monument 26, a conduit 78 is positioned in the monument 26 and is in fluidic communication with both the recess 72 and the fluidic path 62. A depression 80, which extends into the monument 26 proximate to the opening 30, is in fluidic communication with the fluidic path 62. The depression 80 is configured for pooling of water 24 prior to the water 24 flowing over a rim 82 of the depression 80 into the opening 30. Alternatively, as is shown in FIG. 3, a tubular void 94 may enable flow from the depression 80 to the opening 30. Thus, with the monument 26 having the configuration depicted in FIGS. 1-5, the water 24 first is pumped into the recess 72, where it causes the ball 74 to float and to rotate. The water 24 then flows through the conduit 78 and enters the channel 68 where it flows down into the depression 80. The water 24 then flows over the rim 82 of the depression 80 through the opening 30 into the reservoir 22.

The integrated fountain and vase assembly 10 also may comprise a storage module 84, which is attached to or selectively attachable to one or more of the vessel 12 and the monument 26. As is shown in FIG. 4, the storage module 84 extends upwardly from the vessel 12 and is opposingly positioned relative to the fluidic path 62. The storage module 84 is configured for stowage of one or more items 86, such as candies, office supplies, cooking utensils, or the like. The storage module 84 may comprise a framework 88, which defines a pair of baskets 90, or other stowage means, such as, but not limited to, compartments, shelves, or the like.

The present invention also anticipates an integrated fountain and vase system 92, which comprises an integrated fountain and vase assembly 10, as describe in the specification above. Water 24 is positioned in the reservoir 22 and a stem 32 of at least one plant 34 is positioned through the opening 30 into the water 24. The stems 32 of the plants 34 may comprise stems 32 of cut flowers 38, as is shown in FIG. 5. The integrated fountain and vase system 92 also may comprise a storage module 84, which is attached to one or more of the vessel 12 and the monument 26. The storage module 84 extends upwardly from the vessel 12 and is opposing positioned relative to the fluidic path 62. As is shown in FIG. 4, the storage module 84 comprises a framework 88, which defines a pair of baskets 90. One or more items 86 is positioned in one or more of the baskets 90.

In use, the integrated fountain and vase assembly 10 is positioned on a substantially horizontal surface and the plug 54 of the power cord 52 is plugged into an outlet 56. Water 24 is added to the reservoir 22 and stems 32 of cut flowers 38 are inserted through the opening 30 into the water 24. The switch 58 is switched to power the water pump 44, causing the water 24 to flow through the tube 46 into the recess 72, where it causes the ball 74 to float and to rotate. The water 24 then flows through the conduit 78 and enters the channel 68 where it flows down into the depression 80. The water 24 then flows over the rim 82 of the depression 80 through the opening 30 into the reservoir 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An integrated fountain and vase assembly comprising:

a vessel, a top of the vessel being open, a bottom of the vessel being closed and substantially planar, wherein the vessel is configured for positioning atop a substantially horizontal surface;

a plate attached to an inner perimeter of the vessel defining a reservoir between the bottom of the vessel and the plate, wherein the reservoir is configured for containing water;

a monument attached to and extending upwardly from the plate;

an opening positioned in the plate, the opening in the plate extending between the monument and the reservoir, wherein the opening is configured for insertion of stems of plants such that cut ends of the stems are positioned in the water in the reservoir;

a water pump positioned in the reservoir;

a tube operationally engaged to and extending from the water pump through the monument, such that the tube opens facing towards an upper end of the monument; and a fluidic path extending between the tube and the opening, at least a segment of the fluidic path extending along an exterior surface of the monument, wherein the water pump is configured for pumping water through the tube, such that the water exits the tube towards the upper end of the monument and flows downwardly along the fluidic path and through the opening, and such that the water is aerated and rendered resistant to formation of algae; and a first ring integrally formed in the monument, the monument being attached to the plate or to the vessel such that the first ring is positioned substantially over the opening, wherein the first ring is configured for supporting the stems of the plants in a substantially upright configuration.

2. The integrated fountain and vase assembly of claim 1, wherein:

the first ring is attached to the plate and extends from the opening; and the first ring is inverted conical frustrum shaped, wherein the first ring is configured to allow for splaying of the stems.

3. The integrated fountain and vase assembly of claim 1, further including a second ring selectively positionable atop the first ring, wherein the second ring is configured to provide additional support to the stems of the plants.

4. The integrated fountain and vase assembly of claim 1, wherein the segment of the fluidic path comprises a channel.

5. The integrated fountain and vase assembly of claim 1, further including a power module operationally engaged to the water pump, such that the power module is positioned for selectively powering the water pump.

6. The integrated fountain and vase assembly of claim 5, further including a switch operationally engaged to the power module and the water pump, wherein the switch is configured to be switched to selectively power the water pump.

7. The integrated fountain and vase assembly of claim 1, further including a recess extending into the upper end of the monument, such that the tube opens into the recess, wherein the recess is configured for pooling of water prior to the water entering the fluidic path.

8. The integrated fountain and vase assembly of claim 7, further including:

the recess being substantially hemispherical; and a ball substantially circumferentially complementary to the recess, such that the ball is selectively positionable in the recess, wherein the ball is configured for floating and rotating upon the water pooled in the recess.

9. The integrated fountain and vase assembly of claim 7, further including a conduit positioned in the monument, such that the conduit is in fluidic communication with the recess and the fluidic path.

10. The integrated fountain and vase assembly of claim 1, further including a depression extending into the monument such that the depression is in fluidic communication with the fluidic path, wherein the depression is configured for pooling of water prior to the water flowing over a rim of the depression into the opening.

11. An integrated fountain and vase assembly comprising:

a vessel, a top of the vessel being open, a bottom of the vessel being closed and substantially planar, wherein the vessel is configured for positioning atop a substantially horizontal surface;

a plate attached to an inner perimeter of the vessel defining a reservoir between the bottom of the vessel and the plate, wherein the reservoir is configured for containing water;

a monument attached to and extending upwardly from the plate;

an opening positioned in the plate, the opening in the plate extending between the monument and the reservoir, wherein the opening is configured for insertion of stems of plants such that cut ends of the stems are positioned in the water in the reservoir;

a water pump positioned in the reservoir;

a tube operationally engaged to and extending from the water pump through the monument, such that the tube opens facing towards an upper end of the monument;

a fluidic path extending between the tube and the opening, at least a segment of the fluidic path extending along an exterior surface of the monument, wherein the water pump is configured for pumping water through the tube, such that the water exits the tube towards the upper end of the monument and flows downwardly along the fluidic path and through the opening, and such that the water is aerated and rendered resistant to formation of algae; and a storage module attached to or selectively attachable to one or more of the vessel and the monument, such that the storage module extends upwardly from the vessel and is positioned extending away from the monument in a direction away from the fluidic path, wherein the storage module is configured for stowage of one or more items.

12. The integrated fountain and vase assembly of claim 11, wherein the storage module comprises a framework defining a pair of baskets.

13. An integrated fountain and vase system comprising:

an integrated fountain and vase assembly comprising:

a vessel, a top of the vessel being open, a bottom of the vessel being closed and substantially planar, wherein the vessel is configured for positioning atop a substantially horizontal surface, a plate attached to an inner perimeter of the vessel defining a reservoir between the bottom of the vessel and the plate, wherein the reservoir is configured for containing water, a monument attached to and extending upwardly from the plate;

an opening positioned in the plate, the opening in the plate extending between the monument and the reservoir, wherein the opening is configured for insertion of stems of plants such that cut ends of the stems are positioned in the water in the reservoir;

a first ring integrally formed in the monument, the monument being attached to the plate or to the vessel such that the first ring is positioned substantially over the opening, wherein the first ring is configured for supporting the stems of the plants in a substantially upright configuration a water pump positioned in the reservoir, a tube operationally engaged to and extending from the water pump through the monument, such that the tube opens facing towards an upper end of the monument, and a fluidic path extending between the tube and the opening, at least a segment of the fluidic path extending along an exterior surface of the monument, wherein the water pump is configured for pumping water through the tube, such that the water exits the tube towards the upper end of the monument and flows downwardly along the fluidic path and through the opening, and such that the water is aerated and rendered resistant to formation of algae;

water positioned in the reservoir; and at least one plant having a stem positioned through the opening into the water.

14. The integrated fountain and vase system of claim 13, wherein the stems of the plants comprise stems of cut flowers.

15. The integrated fountain and vase system of claim 13 further including:

a storage module attached to one or more of the vessel and the monument, such that the storage module extends upwardly from the vessel and is positioned extending away from the monument in a direction away from the fluidic path, the storage module comprising a framework defining a pair of baskets; and one or more items positioned in one or more of the baskets.

* * * * *